United States Patent
Fan et al.

(10) Patent No.: US 10,924,019 B2
(45) Date of Patent: Feb. 16, 2021

(54) ASYNCHRONOUS CLOCK PULSE GENERATION IN DC-TO-DC CONVERTERS

(71) Applicant: TEXAS INSTRUMENTS INCORPORATED, Dallas, TX (US)

(72) Inventors: Jiwei Fan, Cary, NC (US); Mingyue Zhao, Cary, NC (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 337 days.

(21) Appl. No.: 15/816,446

(22) Filed: Nov. 17, 2017

(65) Prior Publication Data

US 2018/0145577 A1    May 24, 2018

Related U.S. Application Data

(60) Provisional application No. 62/426,080, filed on Nov. 23, 2016.

(51) Int. Cl.
*H02M 3/158* (2006.01)
*H02M 3/157* (2006.01)
*H02M 3/156* (2006.01)

(52) U.S. Cl.
CPC ......... *H02M 3/1588* (2013.01); *H02M 3/157* (2013.01); *H02M 3/158* (2013.01); *H02M 2003/1566* (2013.01)

(58) Field of Classification Search
CPC .......................................... H02M 3/155–1588

USPC ........................................................ 323/271
See application file for complete search history.

(56) References Cited

U.S. PATENT DOCUMENTS

| | | | |
|---|---|---|---|
| 8,330,437 B1* | 12/2012 | Hartman | H02M 3/1588 323/222 |
| 2009/0302817 A1 | 12/2009 | Nagai | |
| 2014/0070784 A1* | 3/2014 | Lynch | H02M 3/156 323/283 |
| 2016/0248328 A1* | 8/2016 | Zhang | H02M 3/1584 |

OTHER PUBLICATIONS

Notification of Transmittal of the International Search Report and the Written Opinion of the International Searching Authority, or the Declaration, dated Mar. 6, 2018, 7 pages.

* cited by examiner

*Primary Examiner* — Peter M Novak
(74) *Attorney, Agent, or Firm* — Mark Allen Valetti; Charles A. Brill; Frank D. Cimino

(57) ABSTRACT

Generally speaking, a pulse generation unit can aid load transient response for a DC-to-DC converter. In some examples, a pulse generation unit is coupled to an output voltage of the DC-to-DC converter. The pulse generation unit includes a transient sensing unit and a clock augmentation unit. The transient sensing unit monitors the output of the DC-to-DC converter. When the transient sensing unit detects a load transient, the transient sensing unit generates an additional clock pulse. The clock augmentation unit augments an existing clock signal to include the additional clock pulse.

8 Claims, 5 Drawing Sheets

ASYNCHRONOUS CLOCK PULSE GENERATION IN DC-TO-DC CONVERTERS

RELATED APPLICATION(S)

This application claims the benefit of U.S. Provisional application No. 62/426,080, filed Nov. 23, 2016, which is incorporated by reference in its entirety herein.

FIELD OF THE DISCLOSURE

This disclosure relates generally to converters and, more specifically, to improving the load transient response of converters.

BACKGROUND OF THE DISCLOSURE

Many converters utilize fixed frequency clocks to control a pulse width modulation (PWM) signal. Because the fixed frequency clock only triggers the PWM pulse at regular intervals, the converter only responds to changing load conditions (e.g., load transients) when the next clock pulse triggers the PWM pulse. For example, if the load on the converter increases quickly after the falling edge of PWM signal, the converter will not be able to respond to the increased load condition until the next clock cycle. The longer the delay between the change in the load condition and the converter's response, the greater the impact on the output voltage of the converter. Consequently, a need exists for systems, methods, and apparatuses to improve converter response time to changing load conditions.

SUMMARY

Described herein are systems, methods, and apparatuses that seek to improve converter response time to changing load conditions. In one example, a circuit includes a converter circuit and a pulse generation circuit. The pulse generation circuit reacts to changing load conditions by generating an additional clock pulse for the converter circuit. The pulse generation circuit inserts this additional clock pulse into the clock signal. The additional clock pulse allows the converter circuit to react to the changing load conditions early (i.e., before the next clock cycle). In some embodiments, the pulse generation circuit monitors an output of the converter circuit. If the load on the converter circuit changes significantly enough, the pulse generation circuit generates the additional clock pulse. The additional clock pulse triggers a PWM pulse for the converter circuit.

DETAILED DESCRIPTION

Figure 1:
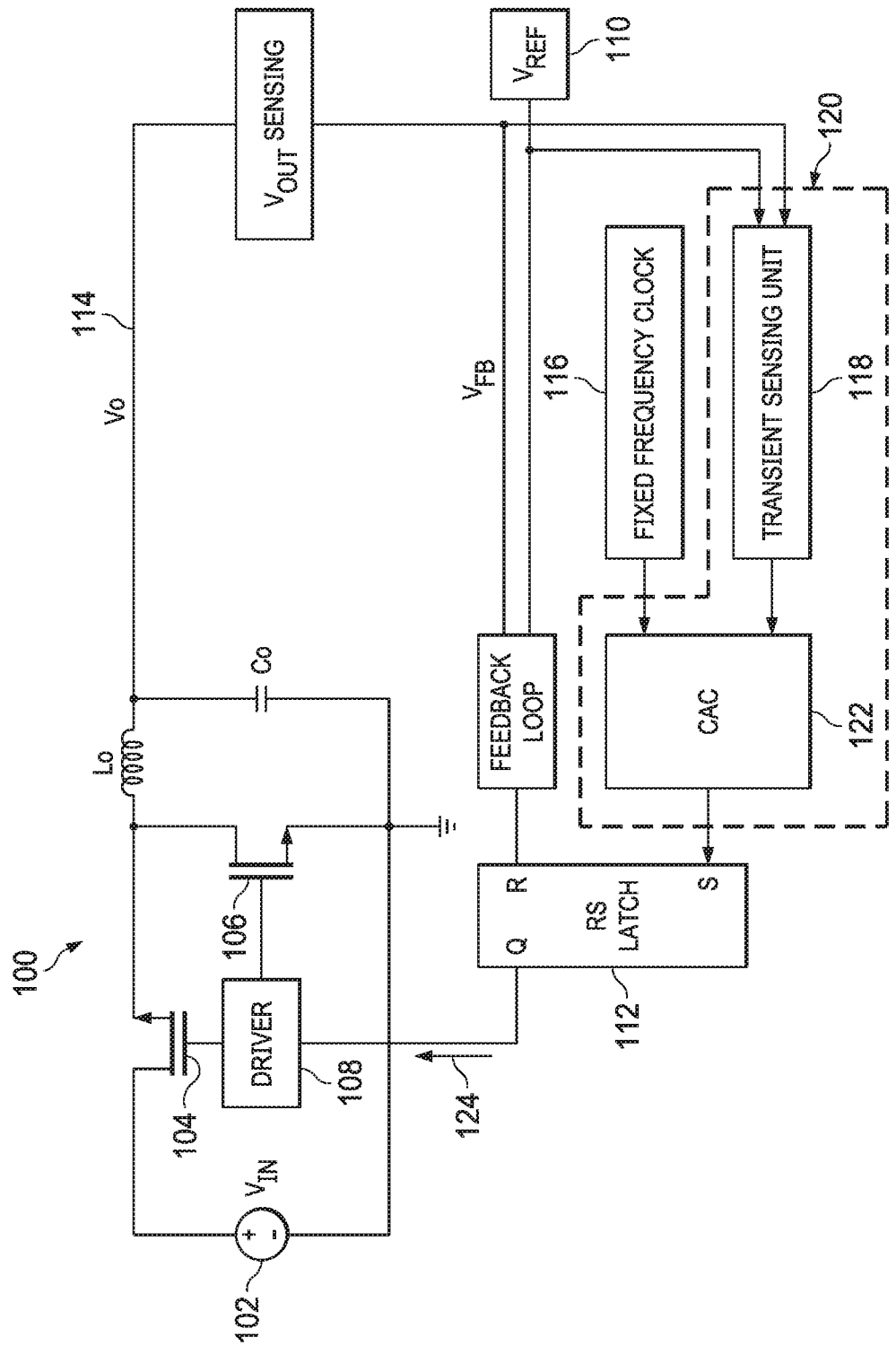
FIG. 1 depicts an example DC-to-DC converter 100 including a pulse generation circuit 120.

Referring now to the figures, FIG. 1 depicts a DC-to-DC converter 100 configured to produce an output voltage, and a pulse generation circuit 120 electrically coupled to the converter circuit 120. The discussions of FIGS. 4, 5, and 6 describe example components of pulse generation circuits 120. The DC-to-DC converter 100 includes a voltage supply ($V_{IN}$) 102, a first switch 104 (e.g., a transistor or physical switch), a second switch 106 (e.g., a transistor or physical switch), a driver circuit 108, a reference voltage source ($V_{ref}$) 110, a latch (or flip flop) 112, and a fixed frequency clock 116. The pulse generation circuit 120 generates additional clock pulses to improve the DC-to-DC converter circuit's 100 response to changing load conditions.

Without the pulse generation circuit 120, the DC-to-DC converter 100 would rely only on the fixed frequency clock 116 to generate clock pulses that trigger PWM pulses, represented by an arrow 124. The PWM pulses cause the driver circuit 108 to operate the first switch 104 and the second switch 106. That is, in response to PWM pulse, the driver circuit 108 may open and/or close one or more of the first switch 104 and the second switch 106. Because the fixed frequency clock 116 generates pulses only at a predetermined interval, the DC-to-DC converter 100 can only adapt to changing load conditions at one of the predetermined intervals. Accordingly, the DC-to-DC converter's 100 response time will vary dependent upon where within the predetermined interval the changing load condition occurs. For example, assume the fixed frequency clock 116 generates a clock pulse every two microseconds (2 μs). If a load transient occurs 1.8 μs after a clock pulse, the DC-to-DC converter 100 will respond to the load transient in 0.2 μs (i.e., at the next clock pulse). However, if a load transient occurs 0.1 μs after a clock pulse, the next clock pulse will not occur for 1.9 μs. In this particular situation, the DC-to-DC converter 100 will not be able to respond to the load transient for 1.9 μs. This delay in response can be problematic because the longer it takes for the DC-to-DC converter 100 to respond to the load transient, the greater the output voltage ($V_o$) will be impacted by the load transient. For example, the longer the it takes the DC-to-DC converter 100 to respond to the load transient, the greater the output voltage ($V_o$) may decrease before the DC-to-DC converter 100 can adjust. The discussion of FIG. 2 describes example waveforms for parameters of a DC-to-DC converter 100 with and without the pulse generation circuit 120.

Figure 3:
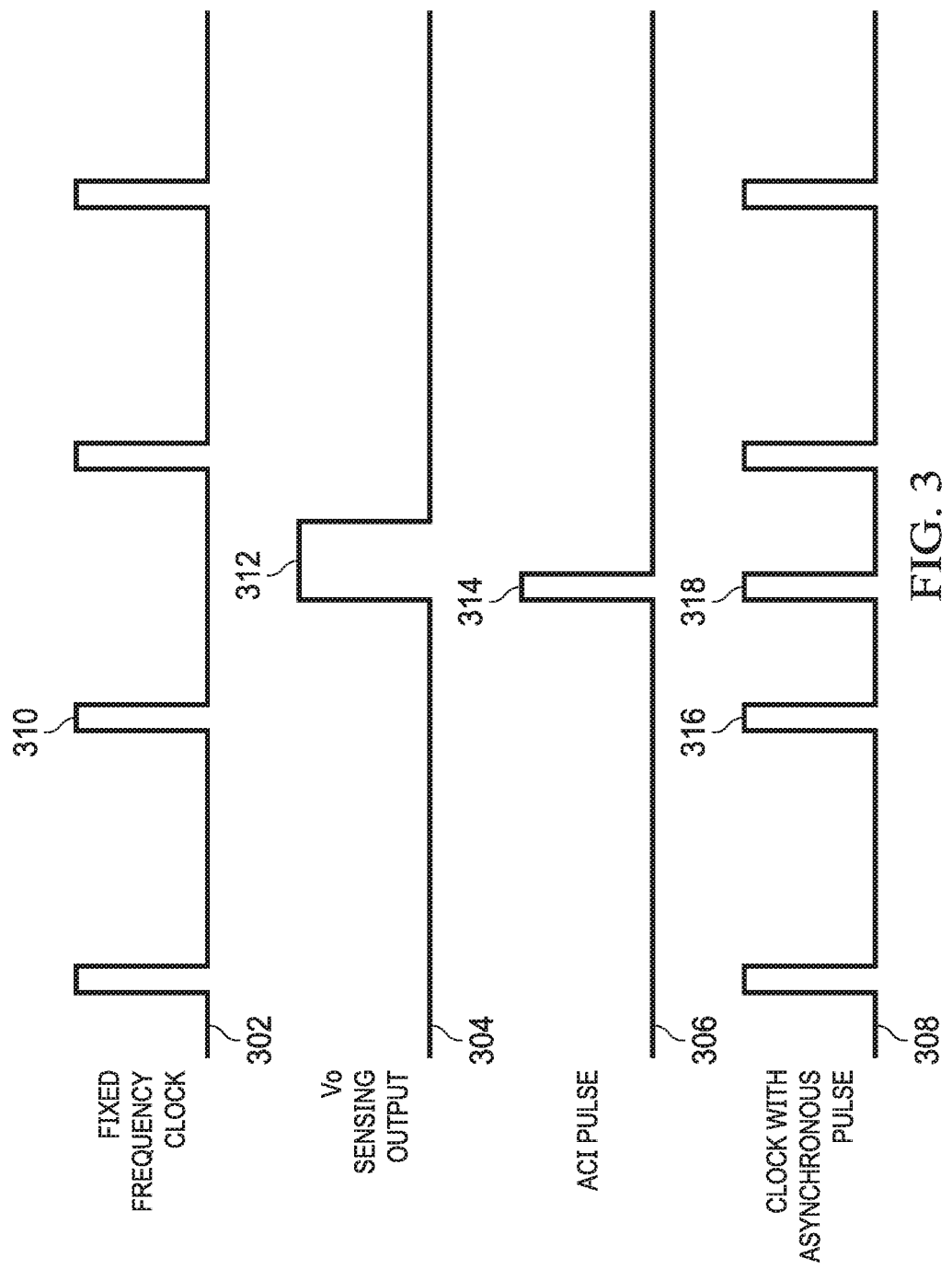
FIG. 3 includes a series of waveforms depicting clock signals for an example DC-to-DC converter.

In some embodiments, the pulse generation circuit 120 can decrease the impact of load changing conditions by reducing the delay and reducing the variation in the delay between the load transient and the DC-to-DC converter's 100 response. At a high level, the pulse generation unit 120 monitors the output voltage 114 of the DC-to-DC converter 100. The transient sensing circuit 118 compares the output voltage 114 to the reference voltage source 110. If the pulse generation circuit 120, specifically the transient sensing circuit 118, detects a significant enough change in the output voltage 114, the pulse generation circuit 120 generates an additional clock pulse. The pulse generation circuit 120 generates the additional clock pulse during the same duty cycle in which the change in the output voltage 114 is detected. After generating the additional clock pulse, the clock augmentation circuit (CAC) 122 augments the fixed frequency clock 116 signal with the additional clock pulse. That is, the CAC 122 adds the additional clock pulse to the fixed frequency clock 116 signal. The discussion of FIG. 3 provides additional information regarding augmentation of the fixed frequency clock 116 signal with the additional clock pulse to form an augmented clock signal. Like the clock signals generated by the fixed frequency clock 116, the additional clock pulse triggers a PWM pulse. The PWM pulses cause the driver circuit 108 to operate the first switch 104 and the second switch 106 (e.g., by opening and/or closing one or more of the two switches), allowing the DC-to-DC converter 100 to respond to the load transient. For example, the driver circuit 108 can amplify the PWM pulse to control the first switch 104 and the second switch 106. The driver circuit 108 can be any component(s) capable of controlling the first switch 104 and the second switch 106.

Figure 2:
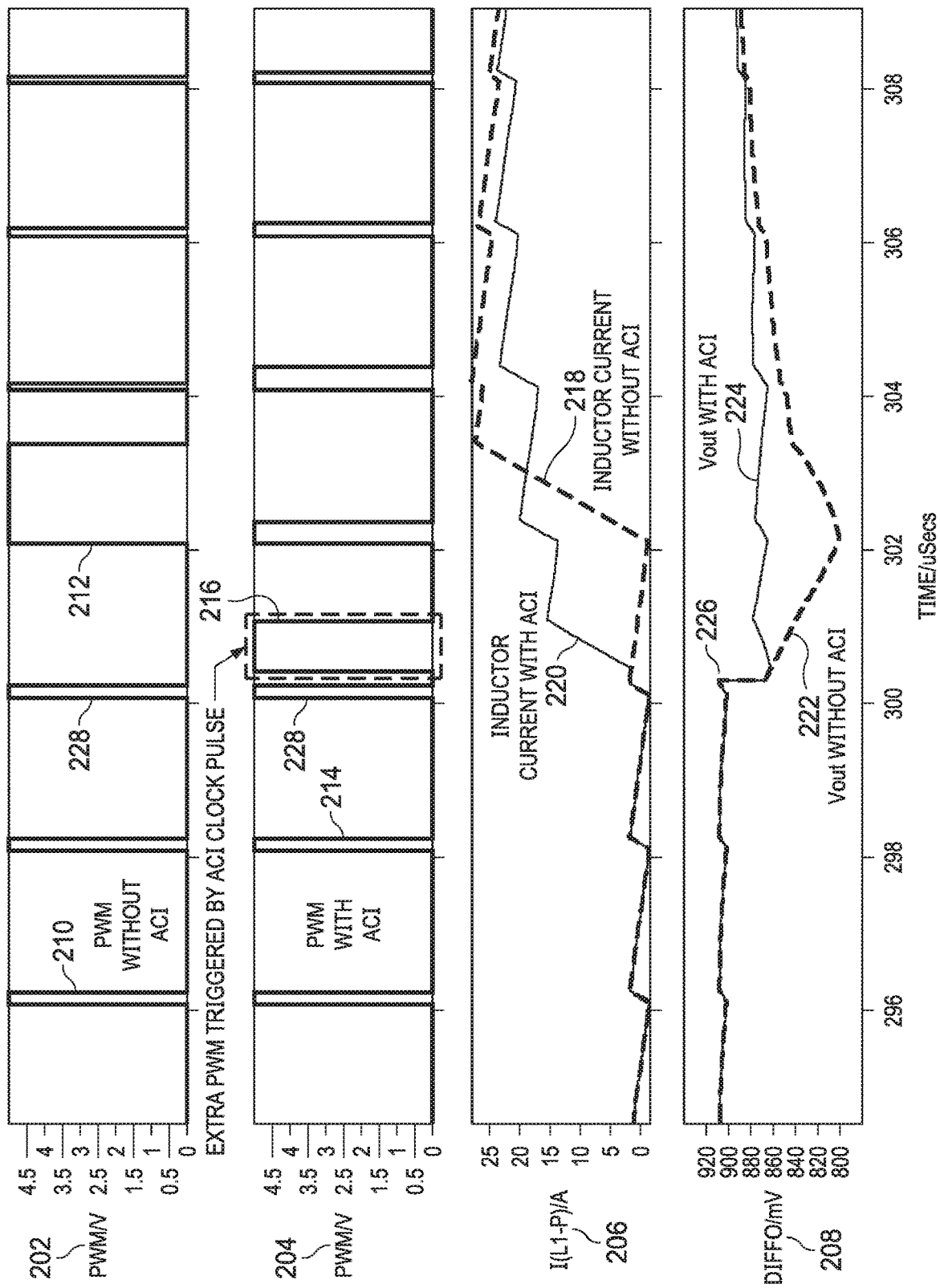
FIG. 2 includes a number of plots depicting waveforms for an example DC-to-DC converter during a load transient condition.

While the discussion of FIG. 1 provides general information regarding a DC-to-DC converter including a pulse generation circuit, the discussion of FIG. 2 describes the impact of quickly responding to a load transient.

FIG. 2 includes a number of plots depicting waveforms for a DC-to-DC converter during a load transient condition. FIG. 2 depicts four plots: a first plot 202, a second plot 204, a third plot 206, and a fourth plot 208.

The first plot 202 and the second plot 204 both depict PWM pulse waveforms generated by the DC-to-DC converter. The first plot 202 depicts the PWM pulse waveform without the benefit of a pulse generation unit to trigger additional PWM pulses. That is, the first plot 202 depicts only the PWM pulses generated by a fixed frequency clock. Each PWM pulse in the first plot 202 is indicated by a peak 210. As can be seen, the rising edge of the peaks 210 occur at regular intervals (i.e., at approximately a 2 µs interval). The rising edge of the peaks 210 occur with this regularity because the PWM pulses are triggered by the fixed frequency clock. Put simply, each clock pulse generated by the fixed frequency clock triggers a PWM pulse.

The second plot 204 depicts a PWM pulse waveform when an additional PWM pulse (the "extra" PWM pulse 216) is triggered by the additional clock pulse inserted into the clock signal by the pulse generation circuit. This additional clock pulse is generated by the pulse generation circuit, not the fixed frequency clock. Thus, the additional clock pulse generated by the pulse generation circuit is a clock pulse in addition to those generated by the fixed frequency clock. Each PWM pulse in the second plot 204 is indicated by a peak 214. As with the first plot 202, the PWM pulses occur with regular frequency based on the fixed frequency clock. That is, each PWM pulse triggered by a clock pulse from the fixed frequency clock occurs with regularity. The rising edge of the extra PWM pulse 216, however, does not follow this pattern because it is triggered by the additional clock pulse. In other words, the extra PWM pulse 216 is not in synch with the clock pulses generated by the fixed frequency clock because the extra PWM pulse 216 is triggered by the additional clock pulse generated by the pulse generation circuit. The additional clock pulse is asynchronous with respect to the fixed frequency clock pulses because the additional clock pulse is not generated by the fixed frequency clock. The pulse generation circuit adds the additional clock pulse to the clock signal based on the detection of a load transient. The clock signal which includes both the clock pulses generated by the fixed frequency clock and the clock pulse generated by the pulse generation circuit is referred to as an augmented clock signal.

The third plot 206 depicts current within the DC-to-DC converter. The third plot 206 includes two current waveforms: a first current waveform 218 and a second current waveform 220. The first current waveform 218 depicts current within the DC-to-DC converter during a load transient condition without the benefit of an additional PWM pulse being triggered by the pulse generation unit. That is, the first current waveform 218 depicts current within the DC-to-DC converter when clock pulses are generated only by the fixed frequency clock. The second current waveform 220 depicts current within the DC-to-DC converter when the pulse generation unit triggers an additional PWM pulse in response to the load transient. That is, the second current waveform 220 depicts current within the DC-to-DC converted when the clock pulses are generated by both the fixed frequency clock and the pulse generation circuit.

The fourth plot 208 depicts the output voltage ($V_{out}$) of the DC-to-DC converter. The fourth plot 208 includes two voltage waveforms: a first voltage waveform 222 and a second voltage waveform 224. The first voltage waveform 222 depicts the output voltage of the DC-to-DC converter during a load transient condition without the benefit of an additional PWM pulse being triggered by the pulse generation unit. That is, the first voltage waveform 222 depicts the output voltage of the DC-to-DC converter during a load transient condition when clock pulses are generated only by the fixed frequency clock. The second voltage waveform 224 depicts the output voltage of the DC-to-DC converter when the pulse generation unit triggers an additional PWM pulse in response to the load transient. That is, the second voltage waveform 224 depicts the output voltage of the DC-to-DC converter during a load transient condition when clock pulses are generated by both the fixed frequency clock and the pulse generation circuit.

The load transient occurs approximately at a point 226, indicated by a drop in the output voltage of the DC-to-DC converter in the fourth plot 208. The load transient occurs shortly after a first PWM pulse 228. The DC-to-DC converter will not respond to the load transient until the next PWM pulse is triggered, which will not be triggered until the next clock pulse occurs. Because the DC-to-DC converter includes a fixed frequency clock, the interval between clock pulses, and thus PWM pulses, is constant (i.e., fixed). As can be seen in the first plot 202, the next PWM pulse is a second PWM pulse 212, occurring roughly 2 µs after the load transient. That is, in the first plot, clock pulses are only generated by the fixed frequency clock so the next clock pulse will not occur until roughly 2 µs after the load transient. Because the DC-to-DC converter does not respond to the load transient until the next PWM pulse, the output voltage of the DC-to-DC converter continues to drop until the next PWM pulse. As depicted in the first voltage waveform of the fourth plot 208, the output voltage of the DC-to-DC converter drops dramatically (approximately 100 mV) during this 2 µs delay. The output voltage of the DC-to-DC converter drops so dramatically because the DC-to-DC converter cannot respond to the load transient until the next clock pulse is generated by the fixed frequency clock. Additionally, the current within the DC-to-DC converter does not increase in response to the load transient until the next PWM pulse as depicted in the first current waveform 218 of the third plot 206.

By contrast, the earlier response by the DC-to-DC converter based on the additional PWM pulse triggered by the pulse generation circuit diminishes the impact of the load transient on the output voltage of the DC-to-DC converter and the current within the DC-to-DC converter. That is, because the pulse generation circuit generates an additional clock pulse (i.e., a clock pulse in addition to those generated by the fixed frequency clock), the DC-to-DC converter can respond to the load transient more quickly (i.e., without waiting until the next clock pulse is generated by the fixed frequency clock). As depicted in the second plot 204, the PWM pulse waveform includes the extra PWM pulse 216. The pulse generation circuit, based on the load transient, generates the additional clock pulse. The additional clock pulse triggers the extra PWM pulse 216. As can be seen in the second voltage waveform 224 of the fourth plot 208, the output voltage of the DC-to-DC converter drops less significantly than the output voltage of the DC-to-DC converter depicted by the first voltage wave from 222 of the fourth plot 208 (approximately 40 mV compared to approximately 100 mV). The output voltage drops less for the DC-to-DC converter including the pulse generation circuit because the additional PWM pulse allows the DC-to-DC converter to respond to the load transient more quickly (i.e., before the next clock pulse would be generated by the fixed frequency clock). Similarly, as depicted by the second current waveform of the third plot 206, the current within the DC-to-DC converter increases sooner after the load transient due to the DC-to-DC converter's faster response to the load transient. The current within the DC-to-DC converter increases sooner after the load transient due to the additional clock pulse generated by the pulse generation circuit.

While the discussion of FIG. 2 describes the impact of quickly responding to a load transient with respect to waveforms associated with a DC-to-DC converter, the discussion of FIG. 3 provides further information regarding the augmentation of a clock signal based on a load transient.

FIG. 3 includes a series of waveforms depicting clock signals for a DC-to-DC converter. Specifically, FIG. 3 depicts four waveforms: a first waveform 302, a second waveform 304, a third waveform 306, and a fourth waveform 308.

The first waveform 302 depicts a clock signal for a fixed frequency clock. Each fixed frequency clock peak 310 of the first waveform represents a clock pulse. Each clock pulse triggers a PWM pulse for the DC-to-DC converter. The fixed frequency clock peaks 310 are spaced at regular intervals because the clock generates a clock pulse at regular intervals (i.e., the clock is a fixed frequency clock). This clock signal is referred to as an existing clock signal in that this clock signal is generated by the fixed frequency clock associated with the DC-to-DC converter. That is, the first waveform 302 depicts only clock pulses generated by the fixed frequency clock.

Figure 4:
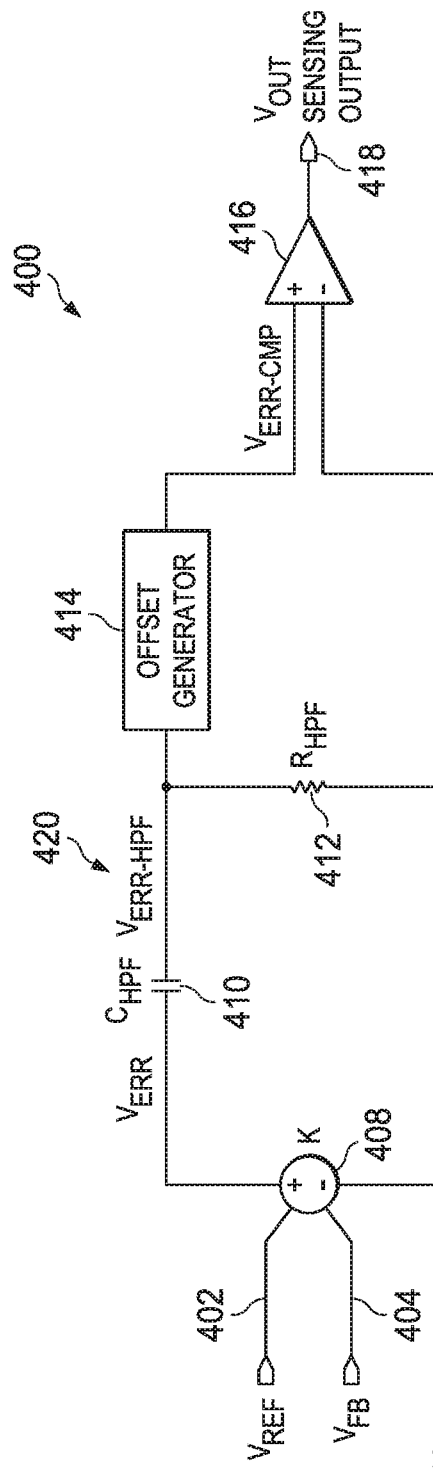
FIG. 4 depicts an example transient sensing unit 400 of a pulse generation circuit including a single filter 420.
Figure 5:
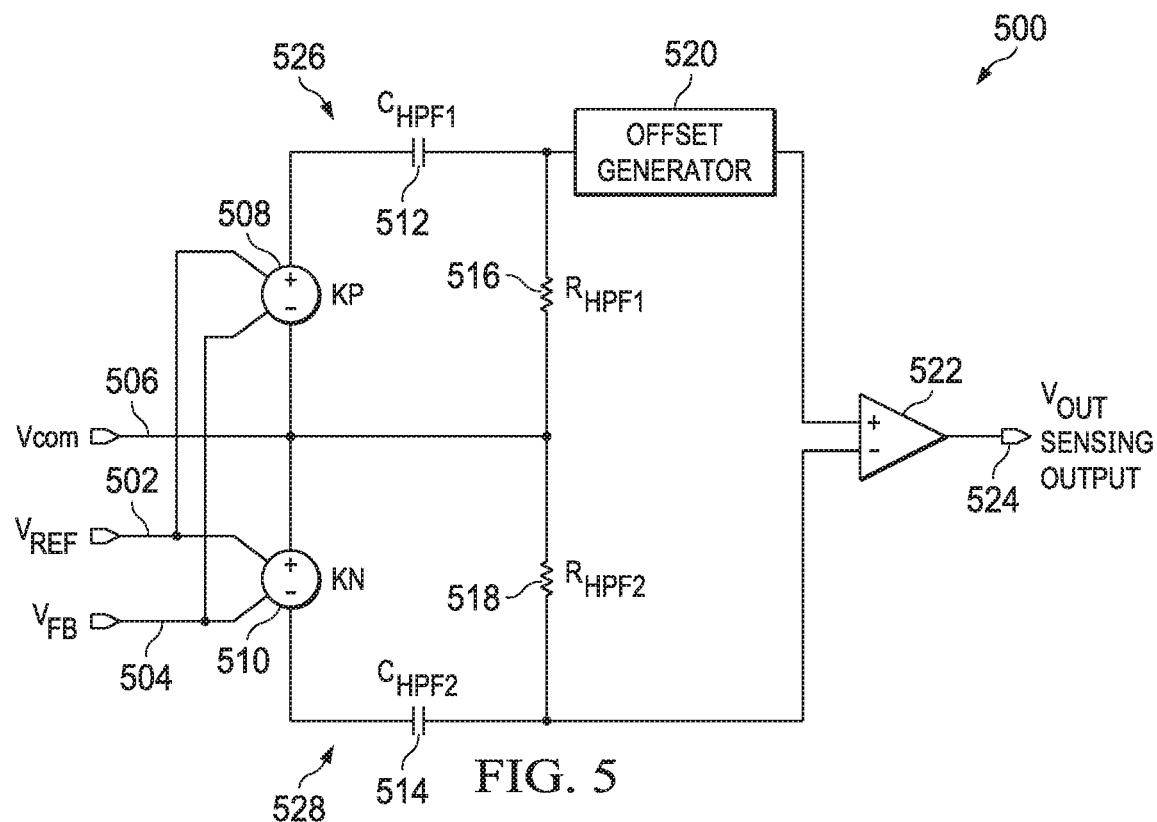
FIG. 5 depicts an example transient sensing unit 500 of a pulse generation circuit including two filters.

The second waveform 304 depicts an output of a transient sensing unit of a pulse generation unit. As discussed with respect to FIG. 1, the transient sensing unit monitors an output voltage of the DC-to-DC converter. The discussion of FIGS. 4 and 5 provide additional details regarding example transient sensing units. When a load transient occurs, the transient sensing unit outputs a signal. This signal is represented by a load transient peak 312.

The third waveform 306 depicts a clock pulse generated by the pulse generation circuit. That is, the third waveform 306 depicts the additional clock pulse, which is generated in addition to those clock pulse generated by the fixed frequency clock. When the transient sensing unit outputs the signal, it causes the pulse generation circuit to produce a clock pulse. The clock pulse generated by the pulse generation circuit is the additional clock pulse. For example, as depicted in FIG. 3, a rising edge of the load transient peak 312 corresponds to an asynchronous pulse peak 314 representing an extra clock pulse (or asynchronous clock insertion, "ACI"). This extra clock pulse (also referred to as an additional clock pulse) is a pulse in addition to those generated by the fixed frequency clock (i.e., the peaks 310 of the first waveform 312). Like the clock pulses from the fixed frequency clock, this extra clock pulse triggers a PWM pulse for the DC-to-DC converter. This extra clock pulse is asynchronous in that it is out of synch with respect to the clock pulses generated by the fixed frequency clock.

The fourth waveform 308 depicts an augmented clock signal. The pulse generation unit creates the augmented clock signal by augmenting the existing clock signal with the additional clock pulse. Accordingly, the augmented clock signal (i.e., the fourth waveform) is a combination of the clock signal for the fixed frequency clock (i.e., the first waveform 302) and the additional clock pulse (i.e., the third waveform 306). As depicted in FIG. 3, the existing clock peaks 316 of the augmented clock signal align with the fixed frequency clock peaks 310 of the clock signal for the fixed frequency clock and the additional clock peak 318 aligns with the asynchronous clock peak 314.

Figure 6:
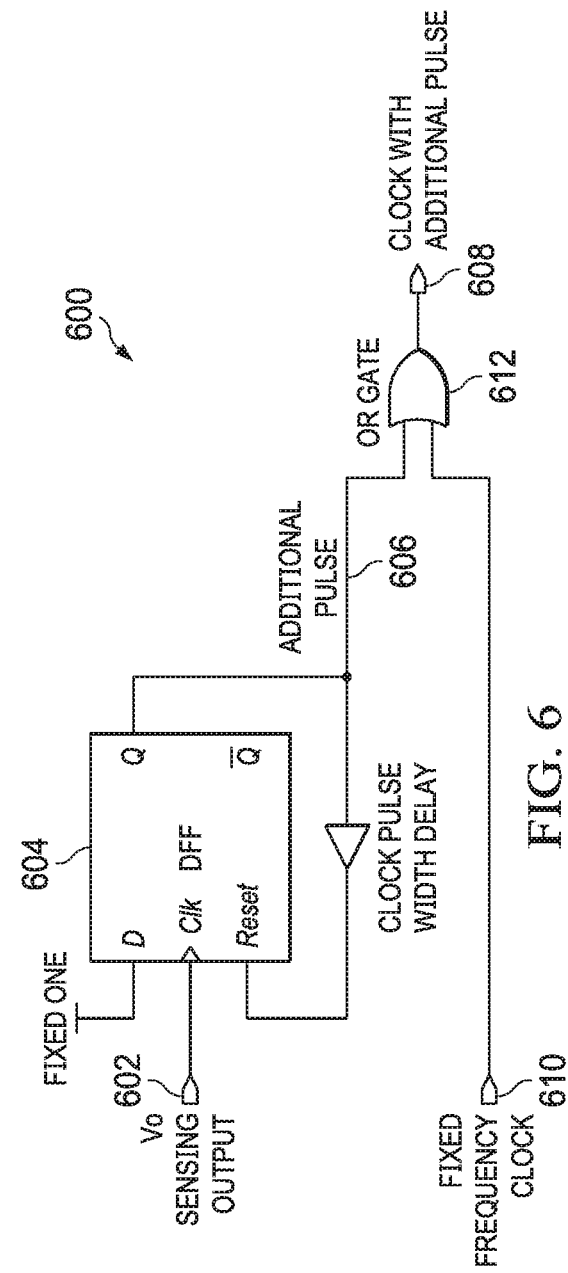
FIG. 6 depicts an example clock augmentation unit 600 of a pulse generation circuit.

While the discussion of FIGS. 1-3 provide background information regarding DC-to-DC converters and pulse generation units, the discussion of FIGS. 4-6 describe the components of exemplary pulse generation circuits in additional detail. Specifically, the discussion of FIG. 4 describes an example transient sensing circuit, according to a first embodiment.

FIG. 4 depicts an example transient sensing circuit 400 of a pulse generation circuit including a single filter circuit 420. The transient sensing circuit 400 monitors the output of the DC-to-DC converter. Specifically, the transient sensing circuit 400 monitors the output of the DC-to-DC converter for the occurrence of load transient conditions. When a load transient condition occurs, the transient sensing circuit 400 generates a transient sensing circuit output indicating that an additional clock pulse is needed. The additional clock pulse is a clock pulse in addition to those generated by the fixed frequency clock.

The transient sensing circuit 400 includes an amplifier circuit 408 having a reference voltage source and the converter circuit's output voltage as inputs. The transient sensing circuit 400 further includes a filter circuit 420, an offset generator circuit 414, and a comparator circuit 416. The filter circuit 420 of the example transient sensing circuit 400 is a high pass filter, and thus comprises a capacitor 410 and a resistor 412.

The transient sensing circuit 400 includes three inputs: a reference voltage source ($V_{REF}$) 402, a feedback voltage ($V_{FB}$) 404, and a common voltage ($V_{COM}$) 406. The feedback voltage 404 is the output voltage of the DC-to-DC converter. The feedback voltage 404 is first compared to the reference voltage source 402. The reference voltage source 402 can be adjusted based on the parameters and/or requirements of the circuit. For example, the reference voltage source 402 can be modified to adjust the sensitivity of the pulse generation circuit to load transients.

In one form, such as the transient sensing circuit 400 depicted in FIG. 4, the reference voltage source 402 and the feedback voltage 404 are amplified before being compared. The reference voltage source 402 and the feedback voltage 404 can be amplified before being compared to amplify the difference in magnitude between the reference voltage source 402 and the feedback voltage 404. The amplifier circuit 408 can have any suitable gain. For example, the gain of the amplifier circuit 408 is between seven and ten. While this amplification step, and thus the amplifier circuit 408, are not required, this amplification step can be beneficial in that the comparator circuit 416 need not be as sensitive if the differences between the voltages are larger. That is, the comparator circuit 416 can be less sensitive, and therefore potentially less expensive, if the magnitude of the difference between the reference voltage source 402 and the feedback voltage 404 is large. For example, if the reference voltage source 402 is 600 mV, the feedback voltage 404 is 550 mV, and the amplifier circuit has a gain of 10, the difference between the amplified reference voltage source 402 (i.e., 6,000 mV) and the amplified feedback voltage 404 (i.e., 5,500 mV) is 500 mV. Without the amplifier circuit 408, the difference between the reference voltage source 402 (i.e., 600 mV) and the feedback voltage 404 (i.e., 550 mV) would be only 50 mV. A more sensitive, and possibly more expensive, comparator circuit 416 is needed to detect a 50 mV difference than a 500 mV difference. Additionally, amplifying the difference between the reference voltage source 402 and the feedback voltage 404 aids in making the transient sensing circuit 400 less sensitive to noise. Like the reference voltage source 402, the common voltage 406 can be adjusted to fine tune the system.

The filter circuit 420 prevents load changes that are not "fast" enough from generating an additional clock pulse. That is, if the rate at which the load is changing is not high enough to pass the filter circuit 420, the output of the comparator circuit 416 will be the common voltage 406, and a transient sensing circuit output 418 will not be generated. If the load change is not "fast" enough to generate an additional clock pulse, the load change on the circuit is therefore not great enough to require an additional clock pulse. The components of the filter circuit 420 (i.e., the capacitor 410 and the resistor 412) can be selected based on the desired filtering effect. That is, the bandwidth of the filter circuit 420 will set the threshold for the speed of the load change on the DC-to-DC converter.

If the rate of the load change is sufficient to pass through the filter circuit 420, an error voltage will pass to the offset generator circuit 414. That is, if the load change is "fast" enough to pass through the filter circuit 420, the load change is significant enough to be a load transient condition for which the DC-to-DC converter will have to compensate. The offset generator circuit 414 generates an offset output based, at least in part, on the reference voltage source 402 and the output voltage. The error voltage is the difference between the reference voltage source 402 and the feedback voltage 404 multiplied by the gain of the amplifier circuit 408, plus the common voltage 406. That is:

$$V_{err}=K(V_{REF}-V_{FB})+V_{COM}.$$

The offset generator circuit 414 controls the magnitude of the load change that will be sufficient to produce the transient sensing circuit output 418. Continuing the example above, in which the reference voltage source 402 is 600 mV, the feedback voltage 404 is 550 mV, the amplifier circuit has a gain of 10, the common voltage 406 is 0 mV, and the offset generator circuit reduces the error voltage by 200 mV, the output of the offset generator circuit will be 300 mV:

$$V_{err}=10(600-550)+0=500 \text{ mV}$$

Offset Generator Voltage=500 mV−200 mV=300 mV

Next the offset generator circuit's offset output voltage passes to the comparator circuit 416. The comparator circuit 416 generates a comparator output based, at least in part, on the offset output and a common voltage 406. If the offset output voltage is greater than the common voltage 406, the transient sensing circuit 400 produces a transient sensing circuit output 418. It should be noted that, based on the filter circuit 420 and the offset generator circuit 414, the transient sensing circuit will only produce the transient sensing circuit output 418 if the rate of the load change and the magnitude of the load change are both sufficiently large. The transient sensing circuit output 418 generates the additional clock pulse. The generation of the additional clock pulse is described in more detail with respect to FIGS. 3 and 6.

While the discussion of FIG. 4 describes a transient sensing circuit including one filter, the discussion of FIG. 5 describes a transient sensing circuit including two filters.

FIG. 5 depicts an example transient sensing circuit 500 of a pulse generation circuit including two filters. As with the transient sensing circuit depicted in FIG. 4, the transient sensing circuit 500 depicted in FIG. 5 monitors the output of the DC-to-DC converter and generates a transient sensing circuit output upon the occurrence of a load transient. Similarly, the transient sensing circuit 500 includes three inputs: a reference voltage source 502, a feedback voltage 504, and a common voltage 506. Additionally, the transient sensing circuit 500 also includes an offset generator circuit 520 and a comparator circuit 522. However, unlike the transient sensing circuit depicted in FIG. 4, the transient sensing circuit 500 depicted in FIG. 5 includes two filters and two amplifiers: a first filter circuit 526, a second filter circuit 528, a first amplifier circuit 508, and a second amplifier circuit 510. The first filter circuit 526 and the first amplifier circuit 508 form a first branch, and the second filter circuit 528 and the second amplifier circuit 510 form a second branch.

Both the first branch and the second branch function in a manner similar to the filter and amplifier combination of the transient sensing circuit depicted in FIG. 4. However, the first branch (including the first filter circuit 526 and the first amplifier circuit 508) and the second branch (including the second filter 528 and the second amplifier 510) provide the inputs for the comparator circuit 522. That is, in the transient sensing circuit 500 depicted in FIG. 5, the second branch provides the comparator circuit 522 with an input in lieu of the common voltage only.

One benefit to this configuration is that larger amplifiers can be used in the transient sensing circuit 500. As previously discussed, the amplifiers can minimize the transient sensing circuit's sensitivity, for example, to noise. Additionally, the amplifiers can help reduce the cost of the circuit by decreasing the sensitivity of the components (e.g., the comparator circuit). Further, in some embodiments, such a two branch configuration may allow a large gain to overcome noise while staying within power limitations of the system. For example, the second branch of the transient sensing circuit 500 can provide these benefits when the gain of the second amplifier circuit 510 is different than that of the first amplifier circuit 508 and/or negative.

While the discussions of FIGS. 4 and 5 describe example transient sensing circuits, the discussion of FIG. 6 describes an example clock augmentation circuit.

FIG. 6 depicts an example clock augmentation circuit 600 of a pulse generation circuit. The clock augmentation circuit 600 includes a flip flop (or latch) 604 and a gate 612 (depicted as an OR Gate). The clock augmentation circuit receives a transient sensing circuit output 602 and a fixed frequency clock signal (i.e., an existing clock signal) 610 as inputs. When the pulse generation circuit detects a load transient, the pulse generation circuit provides the transient sensing circuit output 602 to the clock augmentation unit 600. The transient sensing circuit output causes the generation of an additional clock pulse 606. The clock augmentation circuit 600 augments the fixed frequency clock signal 610 with the additional clock pulse 606 via the gate 612. The result is an augmented clock signal 608, including both the fixed frequency clock signal 610 (i.e., the clock pulses of the fixed frequency clock signal) and the additional clock pulse 606. An example fixed frequency clock signal, additional clock signal, and augment clock signal are depicted in FIG. 3 and described in more detail with respect to FIG. 3.

Figure 7:
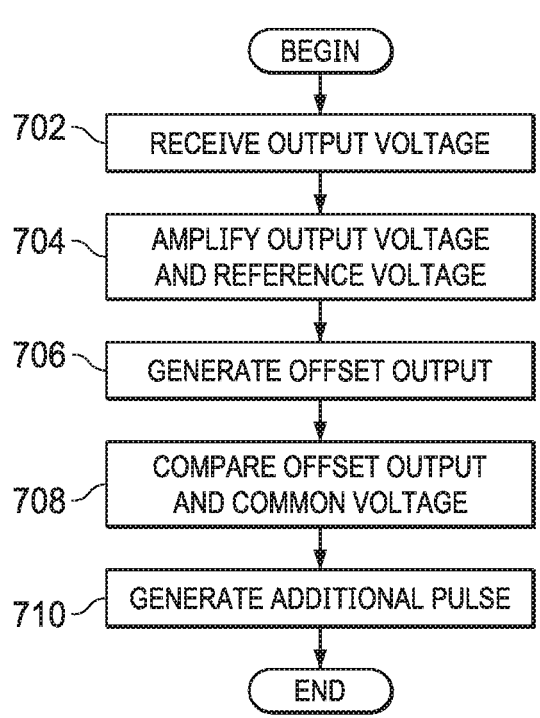
FIG. 7 is a flow chart depicting example operations for augmenting a clock signal of a converter circuit in response to a load transient condition.

While the discussion of FIGS. 4-6 describe the components of exemplary pulse generation circuits in additional detail, the discussion of FIG. 7 describes augmenting a clock signal in response to the detection of a load transient.

FIG. 7 is a flow chart depicting example operations for augmenting a clock signal of a converter in response to a load transient. The flow begins at block 702.

At block 702, an output voltage is received. For example, a pulse generation circuit can receive the output voltage from a circuit, such as a DC-to-DC converter. The pulse generation circuit monitors the output voltage of the DC-to-DC converter for the occurrence of load transients. If a load transient occurs, the pulse generation circuit will trigger an additional PWM pulse, described in more detail below, that can allow the DC-to-DC converter to respond to the load transient condition more quickly than if the DC-to-DC converted did not include the pulse generation circuit. The flow continues at block 704.

At block 704, the output voltage and a reference voltage source are amplified. For example, the pulse generation circuit can amplify the output voltage and the reference voltage source. This step can refer to either amplifying the output voltage and the reference voltage source or amplifying a difference between the output voltage and the reference voltage source. Ultimately the output voltage and the reference voltage source will be used to determine the occurrence of a load transient. Amplifying the output voltage and the reference voltage source may help distinguish changes in load, such as load transients, from noise in the circuitry. This amplification step is described in more detail with respect to FIG. 4. The flow continues at block 706.

At block 706, an offset output is generated. For example, the pulse generation circuit can generate the offset output. The offset output is generated based on the difference between the output voltage and the reference voltage source, as well as an offset. The offset can be modified to adjust the sensitivity of the pulse generation circuit to load transients. For example, the larger the offset, the greater the load transient required to before the pulse generation circuit will generate an additional pulse. The generation of the offset output is described in more detail with respect to FIG. 4. The flow continues at block 708.

At block 708, the offset voltage and a common voltage are compared. For example, the pulse generation circuit can compare the offset voltage and the common voltage. If the offset voltage is greater than the common voltage, the pulse generation circuit will generate an additional pulse. The comparison of the offset voltage and the common voltage is described in more detail with respect to FIG. 4. The flow continues at block 710.

At block 710, an additional pulse is generated. For example, the pulse generation circuit can generate the additional pulse. The additional pulse is a clock pulse. The additional clock pulse is used to trigger a PWM pulse for the DC-to-DC converter, allowing the DC-to-DC converter to respond to a load transient. In some embodiments, an existing clock signal is augmented to include the additional pulse. The generation of an additional clock pulse is described in more detail with respect to FIGS. 4 and 6.

Those skilled in the art will recognize that a wide variety of modifications, alterations, and combinations can be made with respect to the above described embodiments without departing from the scope of the disclosure, and that such modifications, alterations, and combinations are to be viewed as being within the ambit of the inventive concept.

What is claimed is:

1. A circuit comprising:
   an input terminal;
   an output terminal;
   a fixed frequency clock circuit configured to generate a clock signal having fixed frequency clock pulses;
   a driver circuit configured to operate a switch, coupled to a switch node between the input and output terminal, in response to pulse width modulation (PWM) pulses; and
   a pulse generation circuit coupled to receive a feedback voltage associated with the output terminal, the pulse generation circuit including:
      a transient sensing circuit having:
         an amplifier configured to amplify a difference between a reference voltage and the feedback voltage;
         a high pass filter having a filter input coupled to receive the amplified difference, and a filter output; and
         a sense output configured to deliver a sense signal corresponding to the filter output; and
      a clock augmentation circuit coupled to the transient sensing circuit, and configured to generate an augmented clock signal for triggering the PWM pulses, wherein the augmented clock signal including the clock signal and an additional clock pulse in response to the sense signal.

2. The circuit of claim 1, wherein the transient sensing circuit includes:
   an offset generator having an offset input coupled to the filter output, and an offset output; and
   a comparator having a non-inverting input coupled to the offset output, an inverting input coupled to receive a common voltage, and a comparator output coupled to the sense output.

3. The circuit of claim 2, wherein the high pass filter includes:
   a capacitor having a first terminal coupled to the filter input, and a second terminal coupled to the filter output; and
   a resistor having a first terminal coupled to the filter output, and a second terminal coupled to receive the common voltage.

4. The circuit of claim 1, wherein the amplifier includes:
   a first amplifier configured to generate a first amplified output based on a first gain on the difference between the reference voltage and the feedback voltage; and
   a second amplifier configured to generate a second amplified output based on a second gain on the difference between the reference voltage and the feedback voltage, the second gain different from the first gain.

5. The circuit of claim 4, wherein the first gain is a positive gain, and the second gain is a negative gain.

6. The circuit of claim 4, wherein the high pass filter includes:
   a first capacitor having a first terminal coupled to the first amplified output, and a second terminal coupled to a first filter output of the filter output;

a first resistor having a first terminal coupled to the first filter output, and a second terminal coupled to receive a common voltage;

a second capacitor having a third terminal coupled to the second amplified output, and a fourth terminal coupled to a second filter output of the filter output; and a second resistor having a third terminal coupled to the second filter output, and a fourth terminal coupled to receive the common voltage.

7. The circuit of claim 6, wherein the transient sensing circuit includes:

an offset generator having an offset input coupled to the first filter output, and an offset output; and a comparator having a non-inverting input coupled to the offset output, an inverting input coupled to the second filter output, and a comparator output coupled to the sense output.

8. The circuit of claim 1, wherein the clock augmentation circuit includes:

a flip-flop having a clock input coupled to receive the sense signal from the transient sensing circuit, a reset input, and a non-inverting output;

a delay element coupled between the non-inverting output and the reset input of the flip-flop; and an OR gate having a first input coupled to the non-inverting output of the flip-flop, a second input coupled to receive the clock signal from the fixed frequency clock circuit, and an output configured to deliver the augmented clock signal.

* * * * *